United States Patent [19]

Ohgake et al.

[11] Patent Number: 5,340,596

[45] Date of Patent: Aug. 23, 1994

[54] METHOD FOR PRESERVING THE DEGREE OF FRESHNESS OF EGGS

[75] Inventors: Ryoji Ohgake, Yachimatamachi; Mitsuo Okada; Hiroyuki Takashima, both of Yokohama; Toshishige Kurosawa, Tokyo; Takashi Kurosawa, Sakai; Seiji Oda, Ashiya; Niro Takemasa; Kousaku Okamura, both of Kobe, all of Japan

[73] Assignees: Nippon Oil Co., Ltd.; Ikari Corporation, Japan

[21] Appl. No.: 967,531

[22] Filed: Oct. 27, 1992

Related U.S. Application Data

[63] Continuation of Ser. No. 598,255, Oct. 16, 1990, abandoned.

[30] Foreign Application Priority Data

Jul. 2, 1990 [JP] Japan ................................. 2-174991

[51] Int. Cl.$^5$ ............................................. A23B 5/00
[52] U.S. Cl. ..................... 426/301; 426/298; 426/300; 426/614
[58] Field of Search ............... 426/300, 614, 298, 301, 426/302, 308, 310

[56] References Cited

U.S. PATENT DOCUMENTS

| | | | |
|---|---|---|---|
| 2,014,646 | 12/1935 | Christian et al. | 426/300 |
| 2,184,063 | 12/1939 | Meyer et al. | 426/300 |
| 2,618,562 | 11/1952 | Mulvany | 426/300 |
| 3,148,649 | 9/1964 | Moore et al. | 426/300 |
| 3,997,674 | 12/1976 | Ukai et al. | 426/90 |

OTHER PUBLICATIONS

Ootsuka et al., Patent Abstracts of Japan, 55-81568, (1980), abstract only.

Nagao et al., Patent Abstracts of Japan, 56-18540, (1981), abstract only.

Romanoff, A. L. and Yushok, W. D., 1947, Preservation of intact eggs by sealing with chemical agents, Cornell University Agricultural Experiment Station, pp. 331-335.

Yamauchi et al, "Chemical Abstracts", vol. 91, abstract no. 191563X (1979).

Yamane et al, "Chemical Abstracts", vol. 92, abstract no. 196658n (1980).

Derwent Publications, Abstract of JP-A-55001019 (Taka Shokuhin Kogyo) (1980).

*Primary Examiner*—Donald E. Czaja
*Assistant Examiner*—Leslie Wong
*Attorney, Agent, or Firm*—Ostrolenk, Faber, Gerb & Soffen

[57] ABSTRACT

A method for preserving the degree of freshness of poultry shell eggs is disclosed which comprises spraying the surface of a shell egg with an effective amount of a composition comprising a triglyceride of saturated fatty acids (I) of the following general formula:

$$\begin{array}{l} CH_2-OCOR^1 \\ | \\ CH-OCOR^2 \\ | \\ CH_2-OCOR^3 \end{array} \quad (I)$$

wherein: $R^1$, $R^2$ and $R^3$ are the same or different, linear aliphatic hydrocarbon groups containing from 5 to 21 carbon atoms, and as an essential ingredient, a fatty acid (II) containing from 12 to 20 carbon atoms in an amount of from 0.01 to 0.5% by weight on the basis of the total weight of the composition.

6 Claims, 4 Drawing Sheets

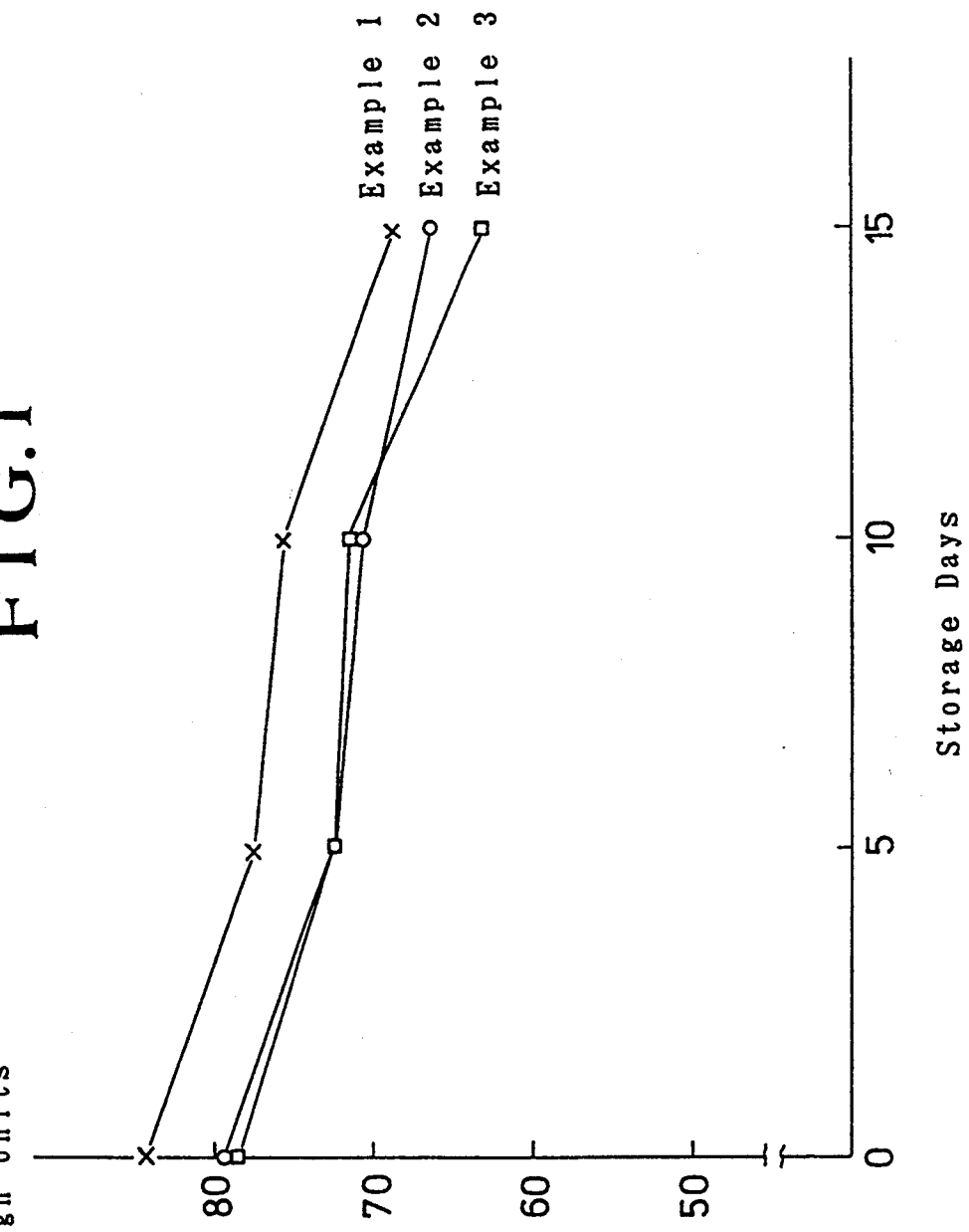

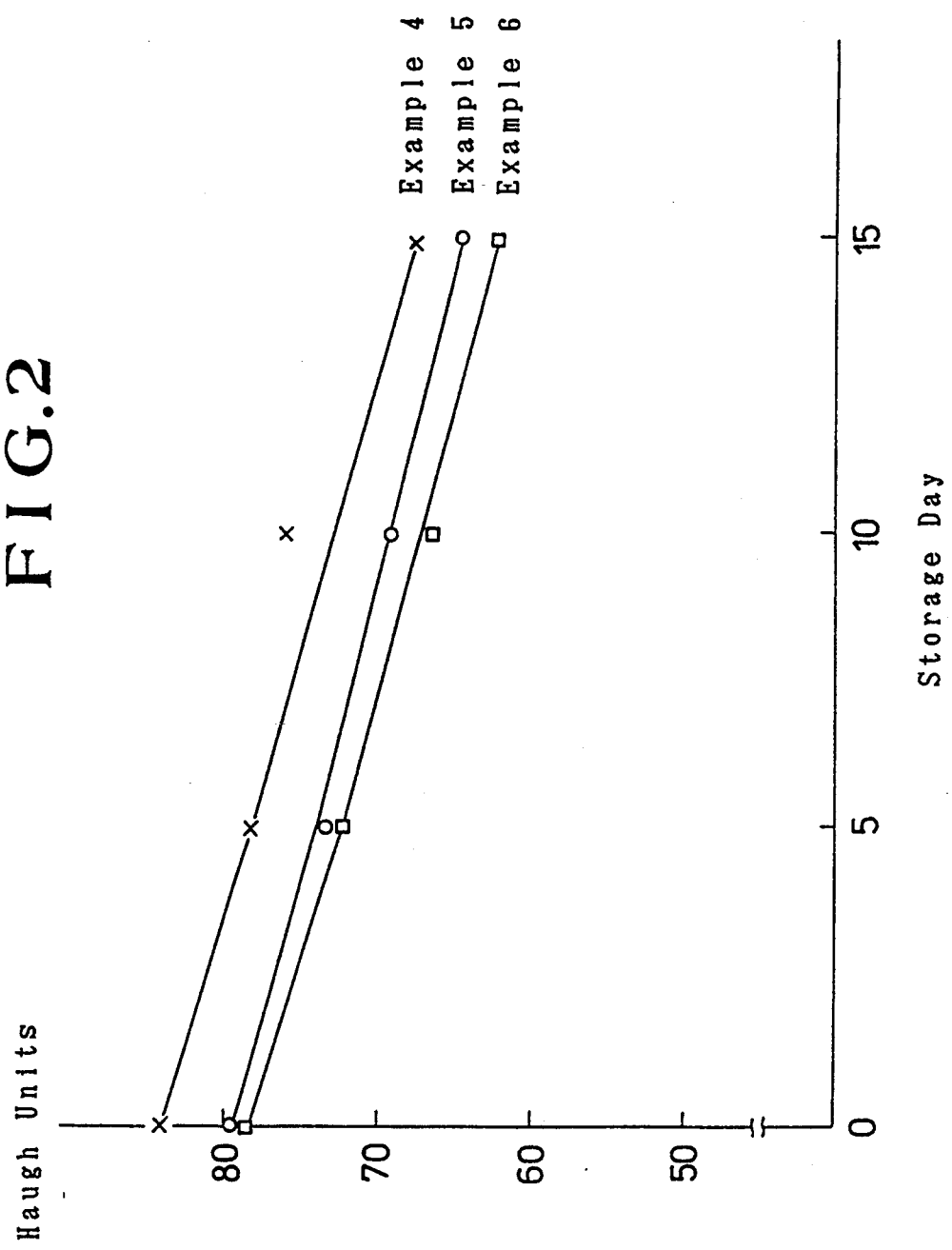

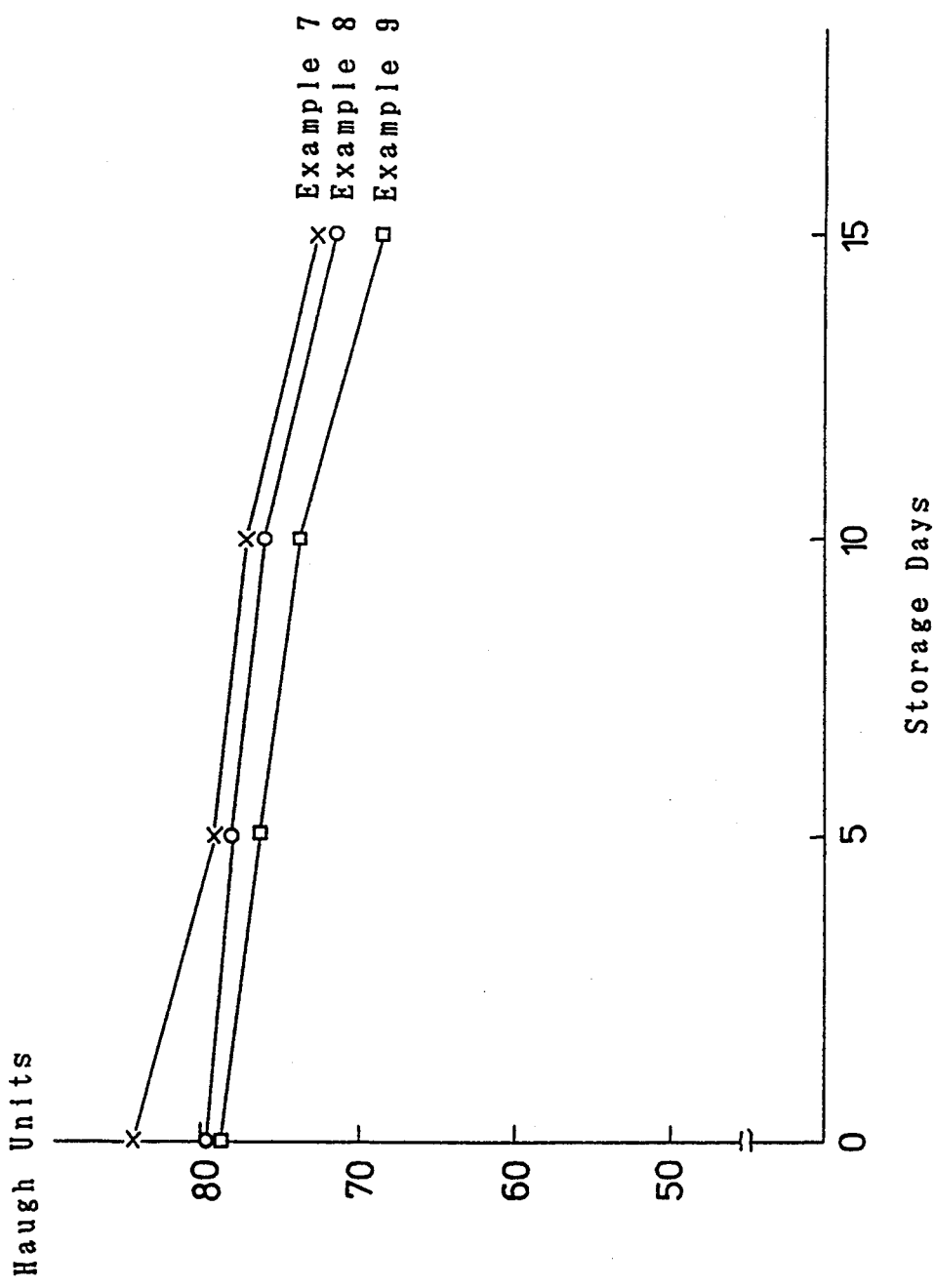

METHOD FOR PRESERVING THE DEGREE OF FRESHNESS OF EGGS

This is a continuation of application Ser. No. 07/598,255 filed on Oct. 16, 1990 now abandoned.

BACKGROUND OF THE INVENTION (1) Field of the Invention

This invention relates to a method for preserving the degree of freshness of poultry eggs, such as hen's eggs, quail eggs, and duck eggs.

(2) Description of the Prior Art

When a new-laid poultry shell egg has been stored without washing in a room for a period of from 16 to 42 days, bacteria will be detected in the contents of the egg. However, such a washing is not preferable because washing will destroy a protective cuticula layer on the surface of an egg which is impregnable to most bacteria. As a result, the invasion of bacteria will be in evidence in the contents of the shell egg in about 9 days after washing. Therefore, new-laid poultry shell eggs are usually delivered to retailers' stores the day after laying and displayed for sale on their shelves for at most 3 days. After the term expired, the eggs left unsold are treated to make processed foodstuffs. Judging from the delivery and sanitary point of view, it is worthwhile to prolong the present period of time during which the degree of freshness of eggs is preserved. A present method fop preserving the degree of freshness of eggs comprises coating the surface of a shell egg with mineral oil such as liquid paraffin or an emulsion thereof. The degree of freshness of eggs can be preserved for several months by such a treatment. However, the coating with liquid paraffin is not preferable because such coating induces surface stickiness. Further, there is a safety problem because liquid paraffin is a fraction of mineral oil. Poultry shell eggs are usually pasteurized to sterilize against salmonelas which may be mixed in fecal matters in certain cases. However, said sterilization process does not influence significantly over the preservation of the degree of freshness of eggs.

There is a continuing demand for improvements in the method for preserving the degree of freshness of poultry shell eggs and a composition for the freshness-preservation of poultry shell eggs.

OBJECT OF THE INVENTION

It is the object of this invention to provide a new, safe and effective method for making the degree of freshness of poultry shell eggs keep long.

SUMMARY OF THE INVENTION

The benefits and advantages of the present invention are achieved in accordance with the composition aspects thereof by providing a method which comprises spraying the surface of a shell egg with an effective amount of a composition comprising a triglyceride of saturated fatty acids (I), as an active base i.e. main constituent, of the following general formula:

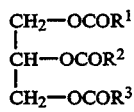

wherein: $R^1$, $R^2$ and $R^3$ are the same or different, linear aliphatic hydrocarbon groups containing from 5 to 21 carbon atoms.

The benefits and advantage of the present invention are also achieved in accordance with the composition aspects thereof by providing a method which comprises spraying the surface of a shell egg, with an effective amount of a composition comprising a triglyceride of saturated fatty acids (I), as an active base, of the following general formula:

wherein: $R^1$, $R^2$ and $R^3$ are the same or different, linear aliphatic hydrocarbon groups containing from 5 to 21 carbon atoms, and as an essential ingredient, a fatty acid (II) containing from 12 to 22 carbon atoms in an amount of from 0.001 to 5.0% by weight on the basis of the total weight of the composition.

DETAILED DESCRIPTION OF THE INVENTION

Figure 5:
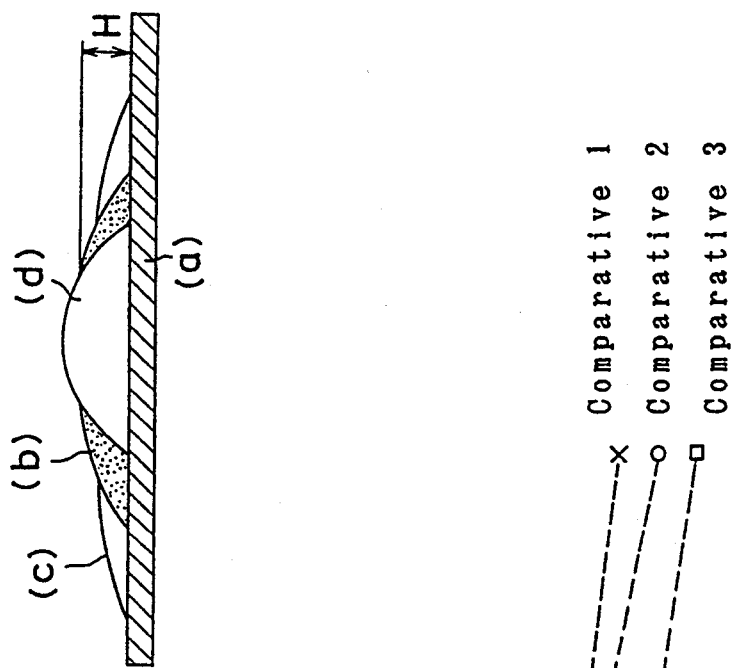

The triglyceride of saturated fatty acids (I) of this invention is of the following general formula:

wherein: $R^1$, $R^2$ and $R^3$ are the same or different, linear aliphatic hydrocarbon groups containing from 5 to 21 carbon atoms.

The triglyceride of saturated fatty acids which does not come within the scope of the claims of this invention is not preferable because it has problems of low atomization, surface stickiness, cold fluidity, or safety to human body.

Typical examples of the preferred linear aliphatic hydrocarbon group represented by $R^1$, $R^2$ or $R^3$ of the present invention include pentyl, hexyl, heptyl, octyl, nonyl, decyl, undecyl, dodecyl, tridecyl, tetradecyl, pentadecyl, hexadecyl, heptadecyl, octadecyl, nonadecyl, eicocyl, henicocyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicocenyl, henicocenyl, and the like. Among them, a linear alkyl group containing from 5 to 21 carbon atoms, more preferably 5 to 11 carbon atoms, is preferable because of its oxidative stability.

Although any processes for manufacturing such a triglyceride of saturated fatty acids of the present invention may be acceptable, one typical process comprises:

hydrolyzing a fat to prepare fatty acid and glycerin,
    extracting said fatty acid to obtain a desired fatty acid fraction suitable for the present invention, and then esterifying the fatty acid fraction with glycerin.

As can be seen from the fact that the triglycerides of the present invention have been approved as food additives by the Health and Welfare Ministry of Japan, said triglycerides are entirely nontoxic to the human body.

Although single use of a triglyceride of saturated fatty acids may be acceptable, a combined use of a triglyceride of saturated fatty acids with a fatty acid containing from 12 to 22 carbon atoms, preferably with a saturated fatty acid containing from 12 to 20 carbon atoms, may extend further a period of time during which the degree of freshness of shell eggs is preserved.

Any fatty acids such as a naturally-occurring fatty acid or a synthetic fatty acid containing from 12 to 22 carbon atoms may be employed in the present invention, with a linear or branched chain fatty acid being acceptable. Typical examples of the fatty acid of the present invention include lauric acid, tridecylic acid, myristic acid, pentadecylic acid, palmitic acid, heptadecylic acid, stearic acid, nonadecanic acid, arachic acid, behenic acid, oleic acid, elaidic acid, cetoleicacid, erucic acid, brassidic acid, linoleic acid, linolenic acid, arachidonic acid, stearolic acid, mixtures thereof, and the like. Among them, a saturated fatty acid containing 14, 16, 18 or 20 carbon atoms, or mixtures thereof is preferred.

These fatty acids have been designated as odorants in the legal definition of the term "food additive", and sorted into the standard raw materials used in the production of cosmetics and it is clear that they are perfectly harmless and safe to the human body.

The amount of the fatty acid containing from 12 to 22 carbon atoms, if it is necessary to be incorporated, is in the range from 0.001 to 5.0% by weight, preferably from 0.01 to 0.5% by weight on the basis of the total weight of the composition.

An addition of a small amount of germicide and/or fungicide and concurrently antioxidant to the present compositions may prolong further the period of time during which the degree of freshness of shell eggs is preserved.

Typical examples of germicide or fungicide include bleaching powder, a high-power bleaching powder, hypochlorous acid, sodium hypochlorite, and the like.

The amount of the germicide and/or the fungicide employed in the present invention is in the range from 50 to 20,000 ppm by weight, preferably from 100 to 15,000 ppm by weight on the basis of the total weight of the composition.

Other additives may be added optionally to the compositions of the present invention to strengthen further the effect of the compositions. Such optional additives should be entirely nontoxic to the human body. Preferred germicides used in the present compositions include alcohols such as ethyl alcohol and oleyl alcohol; citric acid; the oil and fats manufactured from animals and plants and partially hydrogenated products thereof; higher fatty acid esters such as methyl laurate and butyl stearate. Preferred fungicides and concurrently antioxidants used in the present compositions include tert-butyl hydroxyanisol, dibutyl hydroxytoluene, tocopherols (vitamin E), and the like. One or more of the optional additives can be incorporated into a composition of the present invention. Although the amount of said additive may be selected suitably, an amount of less than 3.0% by weight, preferably an amount ranging from 0.001 to 3.0% by weight on the basis of the total weight of the composition is usually appropriate.

According to the present invention, there is provided a method fop preserving the degree of freshness of poultry shell eggs wherein the method comprises spraying the surface of a poultry shell egg with a composition of the invention, said composition comprising a triglyceride of fatty acids.

An example of such spraying process comprises coating the surface of a shell egg with a mist comprising particles having a particle size in the range from 1 to 100 $\mu$m, preferably 10 to 20 $\mu$m. When the particle size is too small, the treatment results in a decrease of coatings whereby a prolonged period of time fop spraying will be necessary to obtain a desired coatings. When the particle size is too large, the treatment results in an excess of coatings and in an increase of stickiness of the shell whereby a period of time for preserving the freshness of eggs will be shortened.

In the case of particle size in the range from 10 to 20 $\mu$m, the duration of spraying is in the range from 2 to 10 seconds, preferably 4 to 7 seconds.

Although any types of spraying nozzle may be acceptable, a nozzle which is capable of producing a mist comprising particles having a particle size in the range from 10 to 20 $\mu$m is most preferable. Japanese Utility Model Application Publication No. 9246/S-63 and No. 8561/H-2 described the nozzles of this kind, and the disclosures of which are incorporated by reference.

FIG. 1 through 4 are individually graphs illustrating the results of the test for the compositions in Example 1 through 9 and Comparative Example 1 through 3 of this invention.

FIG. 5 is a schematic elevation view in section showing the contents of a hen's egg rested on a glass plate (a), wherein (b) is a dense white, (c) is a thin white, (d) is a yolk, and H is the height of a dense white (b).

In order to further illustrate the method of the invention, the following specific examples are provided. It will be understood that the examples as hereinafter set forth are provided for illustrative purposes and are not intended to be limiting of the invention as herein disclosed and set forth in the subjoined claims.

EXAMPLE 1 through 9, COMPARATIVE EXAMPLE 1 through 3

Figure 4:
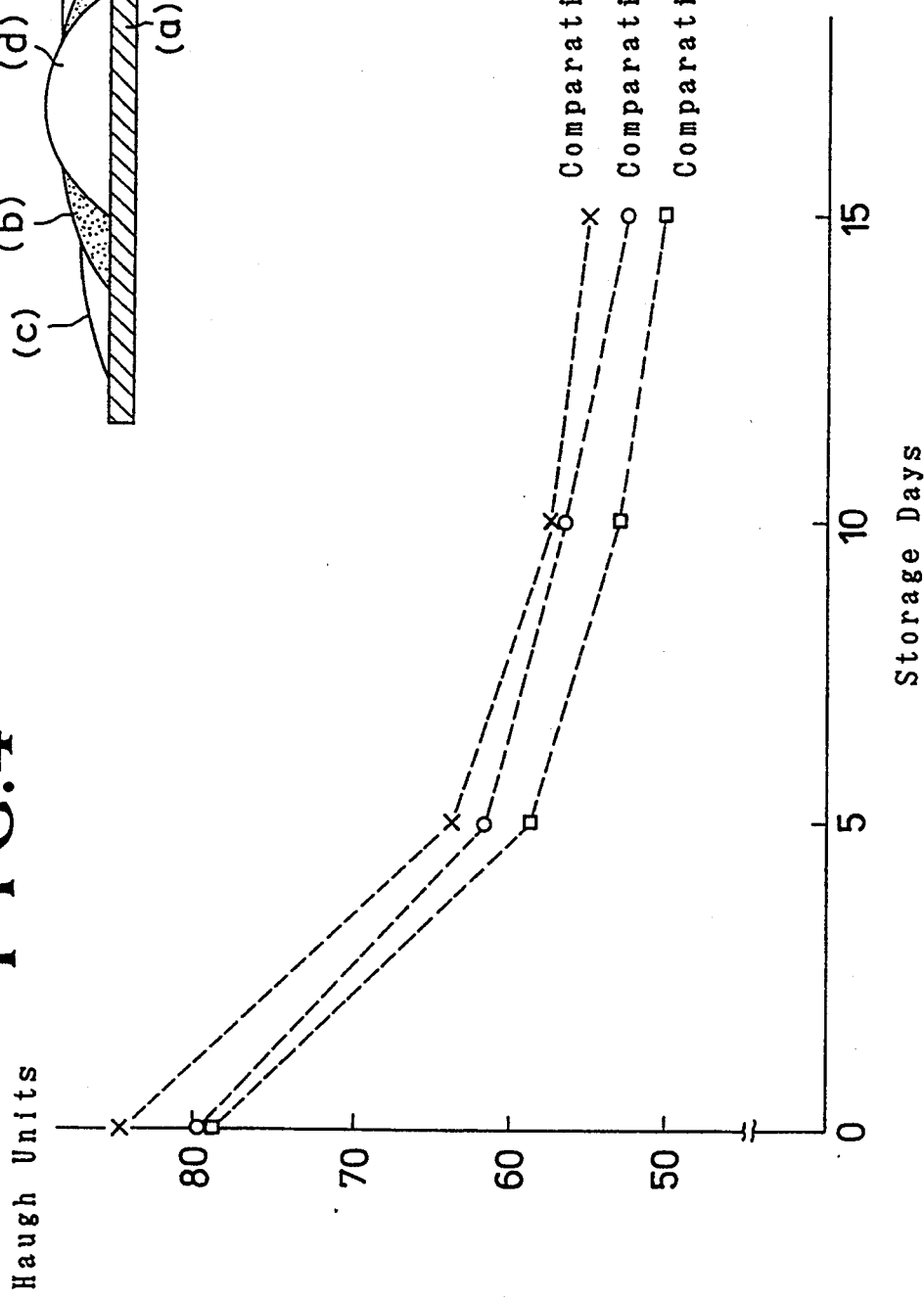

A hen's egg shell was sprayed with each of the following compositions of the present invention for 5 seconds. Haugh units were measured at 20° C. under a humidity of 70% after storage fop 5 days, 10 days and 15 days respectively. The test was run on each of 3 eggs fop one composition. FIG. 1 through 3 give the results of the test. Example 1 through 3 show the results of the test fop Composition A (FIG. 1), Example 4 through 6 show the results of the test for Composition B (FIG. 2), and Example 7 through 9 show the results of the test for Composition C (FIG. 3). FIG. 4 gives the results of the blank test (Comparative Example 1 through 3).

| Composition A | |
|---|---|
| glyceride [1] | 99.0% by weight |
| oleic acid | 1.0% by weight |
| Composition B | |
| glyceride [1] | 49.5% by weight |
| oleic acid | 0.5% by weight |
| alcohol-type germicide [2] | 50.0% by weight |
| Composition C | |
| glyceride [1] | 49.5% by weight |
| oleic acid | 0.5% by weight |
| chlorine type germicide [3] | 50.0% by weight |
| Composition D | |

-continued

| without treatment |
| --- |

[1] a triglyceride of saturated fatty acids containing from 8 to 10 carbon atoms

[2] alcohol content in an amount of 50% by weight and chlorine content in an amount of 15,000 ppm by weight on the basis of the total weight of the composition

[3] chlorine content in an amount of 100 ppm by weight on the basis of the total weight of the composition Haugh units can be computed from the following equation.

$$\text{Haugh unit (HU)} = 100 \log (H - 1.7 W^{0.37} + 7.6)$$

wherein W is the weight of a hen's egg, and H is the height of dense white as is shown in FIG. 5.

Thus according to the present invention, the degree of freshness of poultry shell eggs will be able to preserved for a much longer period of time, and the burden of the waste disposal of inferior shell eggs collected from the market will be greatly relieved.

As can be seen from the fact that a triglyceride of saturated fatty acids or a fatty acid of this invention has been designated as one of the food additives, a composition of the present invention comprising said triglyceride of saturated fatty acids is entirely safe to the human body.

Further, it is noteworthy that there is no possibility of suffocation of shell eggs because the coating on the shell formed by the present invention is permeable to air.

What is claimed is:

1. A method for preserving the degree of freshness of poultry eggs which comprises spraying the surface of a shell egg with an effective amount of a composition consisting essentially of a triglyceride of saturated fatty acids (I) of the formula:

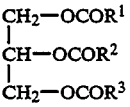

wherein: $R^1$, $R^2$ and $R^3$ are the same or different, linear aliphatic hydrocarbon groups containing from 5 to 11 carbon atoms, and as an essential ingredient, a fatty acid (II) containing from 12 to 20 carbon atoms in an amount of from 0.01 to 0.5% by weight on the basis of the total weight of the composition.

2. A method for preserving the degree of freshness of poultry eggs which comprises spraying the surface of a shell egg with an effective amount of a composition consisting essentially of a triglyceride of saturated fatty acids (I) of the formula:

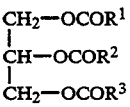

wherein: $R^1$, $R^2$ and $R^3$ are the same or different linear aliphatic hydrocarbon groups containing from 5 to 11 carbon atoms, and as an essential ingredient, a fatty acid (II) containing from 12 to 20 carbon atoms in an amount from 0.01 to 0.5% by weight on the basis of the total weight of the composition and at least one of a germicide and a fungicide in an amount of from 50 to 20,000 ppm by weight as chlorine on the basis of the total weight of the composition.

3. The method of claim 1, wherein said spraying is carried out by spraying with a mist comprising finely divided particles having a particle size in the range of from 1 to 100 μm.

4. The method of claim 2 wherein said spraying is carried out by spraying with a mist comprising finely divided particles having a particle size in the range of from 1 to 100 μm.

5. The method of claim 3, in which the particle size is 10 to 20 μm.

6. The method of claim 4 in which the particle size is 10 to 20 μm.

* * * * *